United States Patent
Chatterjee et al.

(10) Patent No.: US 7,386,797 B1
(45) Date of Patent: Jun. 10, 2008

(54) FRAMEWORK TO MODEL AND EXECUTE BUSINESS PROCESSES WITHIN A COLLABORATIVE ENVIRONMENT

(75) Inventors: Raja Chatterjee, Nashua, NH (US); Amit Dhuleshia, North Andover, MA (US)

(73) Assignee: Oracle Corporation, Redwood Shores, CA (US)

( * ) Notice: Subject to any disclaimer, the term of this patent is extended or adjusted under 35 U.S.C. 154(b) by 457 days.

(21) Appl. No.: 10/154,152

(22) Filed: May 22, 2002

(51) Int. Cl.
*G06F 3/00* (2006.01)
*G06F 3/01* (2006.01)

(52) U.S. Cl. .................... 715/751; 715/229; 715/759; 715/965; 705/1

(58) Field of Classification Search ............... 700/100; 707/10, 100, 103; 705/2, 8, 1; 715/500, 715/751, 864, 229, 759, 965; 718/102
See application file for complete search history.

(56) References Cited

U.S. PATENT DOCUMENTS

| | | | | |
|---|---|---|---|---|
| 4,875,162 | A * | 10/1989 | Ferriter et al. ................. | 705/29 |
| 5,193,186 | A * | 3/1993 | Tamaki et al. ............... | 718/106 |
| 5,301,320 | A * | 4/1994 | McAtee et al. ................ | 705/9 |
| 5,655,118 | A * | 8/1997 | Heindel et al. ......... | 707/103 R |
| 5,671,360 | A * | 9/1997 | Hambrick et al. ............. | 705/9 |
| 5,671,428 | A * | 9/1997 | Muranaga et al. .......... | 715/751 |
| 5,737,727 | A * | 4/1998 | Lehmann et al. ............... | 705/7 |
| 5,819,270 | A * | 10/1998 | Malone et al. ................. | 707/7 |
| 5,890,133 | A * | 3/1999 | Ernst .............................. | 705/7 |
| 5,923,552 | A * | 7/1999 | Brown et al. ................ | 700/100 |
| 5,966,707 | A * | 10/1999 | Van Huben et al. .......... | 707/10 |
| 5,974,468 | A * | 10/1999 | Taylor et al. ................ | 719/328 |
| 6,023,702 | A * | 2/2000 | Leisten et al. .............. | 707/100 |
| 6,026,365 | A * | 2/2000 | Hayashi ......................... | 705/9 |
| 6,044,354 | A * | 3/2000 | Asplen, Jr. ...................... | 705/7 |
| 6,058,395 | A * | 5/2000 | Buzaglo et al. ............... | 707/10 |
| 6,065,011 | A * | 5/2000 | Bulusu et al. .............. | 707/102 |
| 6,073,108 | A * | 6/2000 | Peterson ......................... | 705/8 |
| 6,101,481 | A * | 8/2000 | Miller ............................ | 705/9 |
| 6,212,549 | B1 * | 4/2001 | Page et al. .................. | 709/205 |
| 6,339,838 | B1 * | 1/2002 | Weinman, Jr. .............. | 717/104 |
| 6,349,298 | B1 * | 2/2002 | Malone et al. .................. | 707/7 |
| 6,449,624 | B1 * | 9/2002 | Hammack et al. .......... | 707/203 |
| 6,539,404 | B1 * | 3/2003 | Ouchi ......................... | 715/500 |

(Continued)

OTHER PUBLICATIONS

Leymann F et al, "Workflow based applications", 1997 IBM Systems Journal vol. 36 No. 1 pp. 1-17.*

(Continued)

*Primary Examiner*—Weilun Lo
*Assistant Examiner*—Steven B. Theriault

(57) ABSTRACT

A mechanism of specification of business process templates, to capture commonly performed business activities/workflows/projects within a business organization and encourage reuse of best practices. Long transaction workspaces based business process template execution mechanism are presented, which have several advantages over existing business process execution mechanisms in web collaboration frameworks. This execution approach provides support for an isolated environment for business process execution. This isolates the changes made on different resources while executing a business process from the external world until the business process completes. It enables the ability to concurrently manipulate same resources in different components of a business process, and later resolve conflicts if any and merge the different views of the same resource manipulated by different components of a business process. It also enables easy and effective mechanisms for error recovery and rollback during business process execution.

38 Claims, 8 Drawing Sheets

U.S. PATENT DOCUMENTS

| | | | | |
|---|---|---|---|---|
| 6,571,246 B1 * | 5/2003 | Anderson et al. | | 707/10 |
| 6,604,124 B1 * | 8/2003 | Archbold | | 718/103 |
| 6,606,740 B1 * | 8/2003 | Lynn et al. | | 717/100 |
| 6,609,100 B2 * | 8/2003 | Smith et al. | | 705/8 |
| 6,678,716 B1 * | 1/2004 | Pronsati et al. | | 709/201 |
| 6,714,913 B2 * | 3/2004 | Brandt et al. | | 705/2 |
| 6,754,677 B1 * | 6/2004 | Cho et al. | | 707/201 |
| 6,763,353 B2 * | 7/2004 | Li et al. | | 707/4 |
| RE38,633 E * | 10/2004 | Srinivasan | | 707/10 |
| 6,816,902 B1 * | 11/2004 | Bandat et al. | | 709/226 |
| 6,817,008 B2 * | 11/2004 | Ledford et al. | | 717/102 |
| 6,853,974 B1 * | 2/2005 | Akifuji et al. | | 705/9 |
| 6,877,153 B2 * | 4/2005 | Konnersman | | 717/100 |
| 6,895,573 B2 * | 5/2005 | Nørgaard et al. | | 717/100 |
| 6,920,474 B2 * | 7/2005 | Walsh et al. | | 709/200 |
| 6,928,447 B2 * | 8/2005 | Kaler et al. | | 707/101 |
| 6,938,240 B2 * | 8/2005 | Charisius et al. | | 717/104 |
| 6,968,343 B2 * | 11/2005 | Charisius et al. | | 707/102 |
| 7,096,222 B2 * | 8/2006 | Kern et al. | | 707/100 |
| 2001/0044738 A1 * | 11/2001 | Elkin et al. | | 705/8 |
| 2002/0065701 A1 * | 5/2002 | Kim et al. | | 705/8 |
| 2002/0077842 A1 * | 6/2002 | Charisius et al. | | 705/1 |
| 2002/0078432 A1 * | 6/2002 | Charisius et al. | | 717/102 |
| 2002/0184070 A1 * | 12/2002 | Chen et al. | | 705/9 |
| 2002/0188597 A1 * | 12/2002 | Kern et al. | | 707/1 |
| 2003/0004771 A1 * | 1/2003 | Yaung | | 705/8 |
| 2003/0005406 A1 * | 1/2003 | Lin et al. | | 717/102 |
| 2003/0036940 A1 * | 2/2003 | Leymann et al. | | 705/8 |
| 2003/0050886 A1 * | 3/2003 | Cohen et al. | | 705/37 |
| 2003/0126004 A1 * | 7/2003 | Miller et al. | | 705/9 |
| 2003/0182172 A1 * | 9/2003 | Claggett et al. | | 705/9 |
| 2003/0195785 A1 * | 10/2003 | Thalangara et al. | | 705/8 |
| 2003/0236689 A1 * | 12/2003 | Casati et al. | | 705/7 |
| 2003/0236693 A1 * | 12/2003 | Chen et al. | | 705/9 |
| 2004/0054985 A1 * | 3/2004 | Sewell | | 717/109 |
| 2004/0078777 A1 * | 4/2004 | Bahrami | | 717/105 |
| 2004/0103393 A1 * | 5/2004 | Reddy et al. | | 717/122 |
| 2004/0233056 A1 * | 11/2004 | Pulfer | | 340/568.2 |
| 2005/0257136 A1 * | 11/2005 | Charisius et al. | | 715/511 |
| 2005/0267795 A1 * | 12/2005 | Tian et al. | | 705/10 |

OTHER PUBLICATIONS

Rational Software et al. "Rational Clearcase: Managing Software Projects" Oct. 2001.*

Rational Software et al. "Rational Clearcase: MultiSite user manual" Aug. 2000.*

Documentum Inter-Enterprise Workflow Services Product Data Sheet, 2002 Documentum, Inc., taken from www.documentum.com (2 pages).

Lotus Workflow, taken from www.lotus.com/products/domworkflow.nsf (2 pages), Oct. 28, 2002.

Microsoft SharePoint Portal Server Product Overview, 2003 Microsoft Corporation, taken from www.microsoft.com/sharepoint/server/evaluation/overview (6 pages).

SiteScape Workflow, SiteScape The Collaboration Company, taken from www.sitescape.com/next/p.PDF, Apr. 2001 (1 page).

OnProject Enterprise Platform, 1999-2003 onProject, Inc., taken from www.onproject.com/con_Brands/onproject/cfm_HomePage/products/enterprise.cfm (1 page).

Mangomind and the Security of Your Data on the Internet; Mangosoft, Inc.; pp. 1-5, Copyright Oct. 2000, taken from www.mangosoft.com.

Mangosoft: Secure File-Sharing Services over the Internet; Doug Chandler; pp. 1-11, Copyright 2001, taken from www.mangosoft.com.

The Business Internet File Service[SM]; Doug Chandler; pp. 1-9 Copyright Oct. 2000, taken from www.mangosoft.com.

Website: www.mangosoft.com.

* cited by examiner

FRAMEWORK TO MODEL AND EXECUTE BUSINESS PROCESSES WITHIN A COLLABORATIVE ENVIRONMENT

BACKGROUND OF THE INVENTION

1. Field of the Invention

The present invention is generally related to business processes, and more particularly to the modeling and execution of a business process within a collaboration environment.

2. Brief Description of Related Developments

The advent of the Internet has eased the global presentation and distribution of information. The Internet has been used for collaboration purposes for several years now. There are many software vendors that provide a collaboration environment over the web. But there is a lack of a framework to model and execute real-world business processes in existing collaboration environments over the web.

Traditional workflow modeling and execution is designed to integrate business processes across heterogeneous systems, by modeling and executing control flow across systems. Traditional workflows do not address modeling of business organization structure and data sharing and merging within the hierarchy, which typically occurs during the execution of a complex business process.

Commercial Collaboration system like eRoom™ (ER), Sitescape™ (SI), on Project™ (OP), Microsoft SharePoint Portal Server™ (MSP), IBM's Quickplace™ (IBMQ) provide a comprehensive collaboration framework including sharing of content (file content and limited support for database content) and interaction between project members. These traditional frameworks do not have proper support for collaboration during long duration projects involving relational database content.

Collaboration frameworks mentioned above also do not have proper support for modeling hierarchical project structures. Hierarchical project structures have to provide support for merging both relational and file/folder content across a hierarchy. WEBDAV (WDAV) based collaboration systems do provide support for hierarchical project structures. However, WEBDAV does not natively address the type of content being shared. So, any system built using this specification has to address the problem of support for collaboration on relational content. The non-WEBDAV based collaboration systems do not contain a framework to model hierarchical projects. Also, none of the above mentioned collaboration systems support business processes based on long-transaction frameworks.

Existing web collaboration frameworks do not have a proper framework support for specifying and executing any arbitrary business process. Also, their business process execution frameworks do not provide proper support for isolated business process execution environment, so that the changes to the resources during the business process execution are not exposed to the external world until the business process is terminated properly. They also lack fine-grained access control support on the resources being manipulated during a business process execution. These frameworks also do not support for creating savepoints and rolling back to savepoints (markers to which data in a long transaction can be rolled back to).

The existing web collaboration frameworks does not provide proper support for concurrent updates of the same resource in parallel steps of a business process and then an ability to merge the different views of the same resource from different parallel steps at synchronization time with conflict resolution.

SUMMARY OF THE INVENTION

The present invention is directed to a method of executing a project within a collaborative environment. In one embodiment, the method comprises creating a parent workspace for a parent project and a child workspace for each child project of the parent project. Each child project of the parent project is executed in a respective child workspace, wherein activities of each child project of the parent project continue concurrently in an isolated environment. Each executed child workspace is merged back to the parent workspace so that changes in each child workspace are visible within the parent.

In another aspect, the present invention is directed to a method for collaborative execution of a tasklist. In one embodiment, the method comprises defining the tasklist, where the tasklist includes at least one task to be performed. A workspace for executing the tasklist is created. The tasklist is begun by changing its status to STARTED. If there are multiple start/first tasks within the tasklist, then a workspace is created for each first task. Each first task changes its status to be ACTIVE, so that these tasks can be now started by their respective users. In case the tasklist contain only one first task, then this task can be executed within the tasklist workspace. A tasklist is a set of inter-dependent tasks. Each task can be simple or compound and each compound task includes a number of tasks. A compound task can have one or more first tasks. A first task is executed in the tasklist and its status is changed from ACTIVE to STARTED. A save point corresponding to the completed first task is created in the respective sub-workspace. A next task is executed and a save point is created in the respective workspace. In case the next task is related to the current task via sequential/branch/loop association, then the next task is executed in the same workspace as the current task. If the next task is associated to the current task via parallel association then it is executed in a child workspace of the workspace where the current task is being executed. After the parallel task is over, then the content of the child workspace is merged into its parent task workspace.

When a task is compound, then if the compound task has one first task, that task is executed in the compound tasks workspace. In case the compound task has multiple first tasks, then a child workspace of the compound tasks workspace is created for each first task of the compound task. After all the tasks in the compound task are completed, then all the child workspaces created for the first tasks are merged to the compound tasks workspace, so that it can contain all the data changes made by all the tasks of the compound task.

The step of executing a next task in the tasklist in the dependent chain of tasks is repeated until all tasks in the dependent chain are completed. If the tasklist had multiple first tasks, then those task workspaces are merged into tasklist workspace, so that the tasklist workspace has all the data changes made by all the tasks in the tasklist. In case the tasklist had only one first task, then the tasklist workspace will already have all the data changes made by all the tasks in the tasklist. When the tasklist has ENDED, then the content of the tasklist workspace is merged into the workspace which started/instantiated the tasklist.

In a further aspect, the present invention is directed to a system for modeling and executing tasklists within a collaborative environment. In one embodiment the system comprises a workspace manager adapted to support workspaces for performing tasks. The system also includes a tasklist template adapted to model a tasklist, wherein a tasklist comprises one or more tasks to be performed in workspaces. A tasklist manager is also included that is adapted to execute a tasklist using a set of workspaces, wherein the tasklist manager is adapted to create a workspace in the workspace manager for each tasklist as modeled by the tasklist template. The tasklist manager provides an isolated environment for task execution by executing each task within a workspace.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
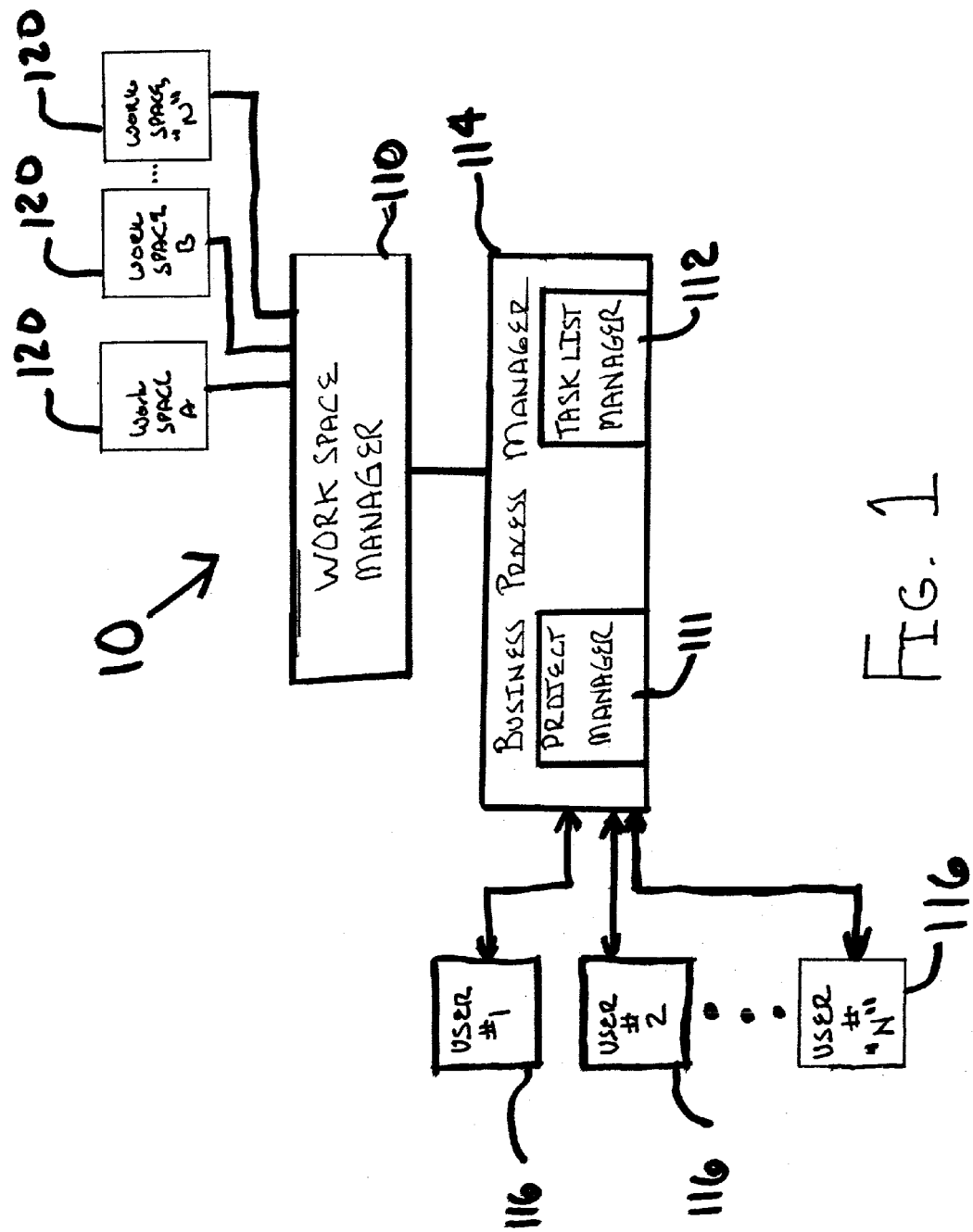
FIG. 1 is a block diagram of one embodiment of a collaborative framework system incorporating features of the present invention.

Referring to FIG. 1, a block diagram of a system 10 incorporating features of the present invention is illustrated. Although the present invention will be described with reference to the embodiment(s) shown in the drawings, it should be understood that the present invention can be embodied in many alternate forms of embodiments. In addition, any suitable size, shape or type of elements or materials could be used.

As shown in FIG. 1, the system 10 generally comprises a collaborative framework including a workspace manager 110, a business process manager 114. The business process manager generally has two components, the tasklist manager 112 and the project manager 111. The tasklist manager 112 is generally responsible for interpreting tasklist template, and instantiating and managing the tasklist instances. The project manager 111 is generally responsible for interpreting project templates, and instantiating and managing project instances. In alternate embodiments, the system 10 can include such other suitable components for modeling and executing real-world business processes in collaboration environments. It is a feature of the present invention to be able to allow multiple users at various locations to communicate and collaborate within the collaboration environment with only a web browser.

In this invention, by business process, we generally refer to two concepts. The first is tasklist, which is a set of inter-dependent tasks performed to accomplish a business goal. One example of a tasklist is the approval of the routing of a business document. An approval routing tasklist could involve the following tasks, EDIT, FIRST ROUND REVIEW (FRR), SECOND ROUND REVIEW (SRR), and APPROVE. The above tasks are generally performed in the order they appear. Also, if the FRR is successful, then SRR starts, otherwise the EDIT task is executed again. If the SRR is successful, then APPROVE task is invoked, or else the EDIT task is executed again. Once the APPROVE task is performed the tasklist is completed.

The second concept referred to in the business process is a project, which is an undertaking in a business organization. A project can involve multiple independent tasklists spanning across different levels in a business organization hierarchy, generally performed by a group of users to achieve a business goal. One example of a project is "IT Rollout of status report". For example, IT Rollout of status report might involve the technology organization group of a company which has three sub-groups. First, the three sub-groups perform some tasklist (which may be different from one another) to generate their individual status report, which is then rolled up to the parent top-level group. The parent top-level group can invoke its own tasklist to integrate the three status reports into one, and sends it to the Chief officer of the technology organization group.

The collaborative framework of the present invention shown in FIG. 1 generally provides support for long transactions, hierarchical projects and tasklists. The collaborative framework of the present invention provides long-transaction-based workspaces 120, such as those shown in FIG. 1, which are the basic containers for collaboration in the collaboration framework. The present invention allows multiple users 116 to modify the same content concurrently in a transitionally consistent manner, and satisfying, for example, ACID properties (JG) across long duration projects. The present invention also provides support for conflict detection and resolution.

The collaboration framework executes business processes defined or specified in the business process manager using the hierarchical set of workspaces 120. This execution mechanism benefits from all the properties of long-transaction based workspaces such as isolation, fine-grained access control, rollback to save-points, and concurrent updates of the same content from parallel steps of a business process.

The present invention generally supports two types of templates, tasklist templates and project templates. The tasklist templates and project templates can be used to model business processes which contains a set of action(s)/task(s) which are performed on certain resources. A tasklist template/type will contain one or more dependent/independent task types/templates, task users(s) and task data, such as for example, the approval routing of business documents. A project template can contain one or more sub-project types, each of which can contain multiple tasklist templates, user (s) and data, such as for example, IT Rollout of status reports within a business organization.

A tasklist is an ordered set of tasks performed to achieve a business goal. The tasklist manager 112 generally provides or models the business process specifications. A task can be automatic (for example, execution of a user-defined procedure) or manual (for example, editing a file). A task can be simple or complex in nature, and may require multiple users 116 to complete it. It can operate on single/multiple resources. The business process manager 114 component of the collaborative framework shown in FIG. 1 supports tasklist template and project template specification, instantiation and execution. The tasklist manager 112 executes tasks using a set of workspaces 120. It should be noted that the workspaces 120 can comprise task workspaces or project workspaces. A different set of operations can be associated with task workspaces and project workspaces, respectively. The workspaces 120, whether task workspaces or project workspaces, generally comprise an environment where work can be done. The environment can comprise a computer medium. A project workspace can include one or more task workspaces. However, a task workspace cannot include a project workspace.

A task type models a task in a tasklist. A task type generally comprises a task name, task description, and task data/resources, which need to be operated on inside the task. A task is an operation performed inside a workspace 120. A task is part of a tasklist and can be manual or automatic. A task can be simple or compound in nature. A compound task generally comprises simple tasks associated with each other by control flow or workflow associations, such as for example Sequential, Parallel, Synchronization, Loop or Branch workflow associations. A task can also have before/after email, alert or callback actions. A task type can model a simple unit of work or a compound unit of work (i.e. an ordered set of task types connected to each other via task associations). Examples of task associations are illustrated in FIGS. 2-5.

Such tasklist can be instantiated directly on resource instances within any workspace 120.

Some examples of tasks in a tasklist related to a salary report are:
EDIT REPORT
REVIEW REPORT
CALCULATE SALARY
CHECK SPELLING/GRAMMAR A tasklist can be triggered by either system/user defined events or explicit invocation.

Examples of events that can trigger a tasklist invocation can include:
Uploading a file within a workspace;
Updating a database row within a workspace;
Explicit invocation within a workspace.

A tasklist can be attached to any resource entity within a workspace (file, folder, dbtable, dbrow, workspace, chart, poll).

Examples of tasklist include:
Analyzing a chart when it gets generated;
Analyzing a poll when it is updated;
Reviewing/Approving a file after it is uploaded;
Reviewing/Approving a database row after it is updated; or Referring to FIG. 1, a tasklist template corresponding to any one of these tasklists, among others can be defined by and made available within workspaces 120.

The workspace users 116 can attach tasklist to resources on certain system/user events or explicitly invoke tasklist on resource entities, or independently without any resource association.

One example of invoking a tasklist on a data entity within a workspace 120 is illustrated below. The tasklist in this case comprises approving a document.

In this example, the input resource is the document to be reviewed. The tasklist as modeled by the tasklist template of FIG. 1 is the approval process. After the approval process is complete, the output resource in the case will be the updated document after review or the original document and the comments or review data.

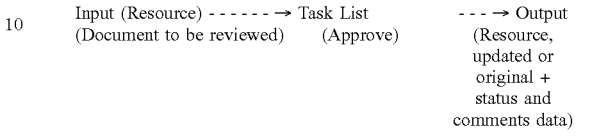

A task type has a number of task users who can perform the task. Each task type can also include a number of user-defined attributes, which can better describe the task, and a system defined "status" attribute, which represents the current state of the task. The "status" attribute value can be INACTIVE, ACTIVE (this is the state when it is ready for getting started), STARTED, ENDED and ABORTED. Each task type can have before begin, and after end callbacks, which will be executed before the task is begun and after the task is ended respectively.

A tasklist type is an ordered set of task types connected to each other via task associations. A tasklist template/type, has a name, set of user-defined attributes and a system defined "status" attribute, which represents the current state of the tasklist (which can be either STARTED or ENDED). In one embodiment, the tasklist type definition can be defined as XML DTD, and users can specify their tasklist types in XML conforming to the DTD.

The workspace manager 110 generally provides an extensible business process modeling and execution framework. For example, the Workspace Manager 110, has support for workspaces 120. In one embodiment, the workspaces 120 comprise eWorkspaces. A workspace 120 can be a virtual container in the web (Internet) where people can aggregate resources, communicate with each other via, email, alerts, discussion list, polls and other collaborative components and share information. In alternate embodiments, a workspace 120 can comprise any suitable collaboration medium. The workspace 120 provides a collaborative environment that is extensible to allow incorporation of new collaborative resources to enhance collaboration within a workspace. Industries and lines of business define processes to increase productivity, and obtain predictable and successful outcomes. Tasklist templates, which define and encourage reuse of best practices are instantiated and executed by creating task workspaces automatically.

The tasklist manager 112 shown in FIG. 1 can be used to model a business process like Approval routing or HR Recruiting etc. The tasklist manager 112 is adapted to specify or model useful activity/set of activities (automatic/manual) that are performed within a workspace 120 set of workspaces to achieve a business goal. It can be simple or complex in nature, and may require multiple users/roles to complete it. The tasklist template 112 can operate on single/multiple resources.

Figure 2:
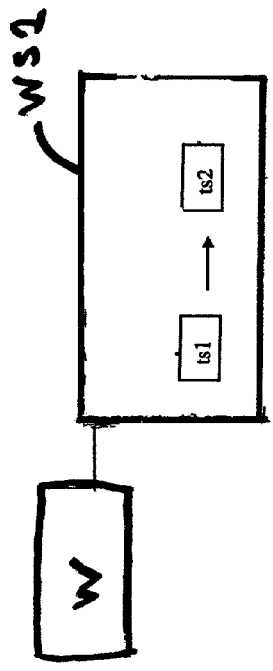
FIGS. 2-5 are illustrations of different task associations that can be implemented and executed in a collaborative framework system incorporating features of the present invention.

The tasklist manager 112 of FIG. 1 provides an isolated environment for task execution by executing the task operations (which may be manual or automatic) within a workspace 120. Referring to FIGS. 2-5, initially, the tasklist manager 112 creates a workspace (w) for each tasklist (t1). In FIG. 2, the first task (ts1) in the tasklist is executed in a workspace (ws1, child of w). After task (ts1) is complete, then the next task (ts2) is executed in the same workspace (ws1) after creating a save-point (sp_ts1) corresponding to executed task (ts1). This ensures that task (ts2) can see the end results of task (ts1).

Figure 3:
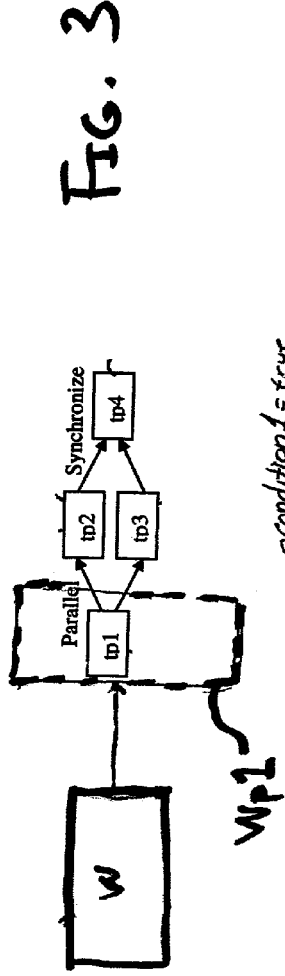

In FIG. 3, the first task (tp1) in the tasklist is executed in workspace (wp1, child of w). After tp1 is complete, a save-point sp-tp1 is created in wp1. Since the next tasks, tp2 and tp3, are parallel tasks, the tasklist manager 112 creates child workspaces (wp2 and wp3) of wp1 for each task tp2 and tp3. Then the process executes tasks tp1 and tp3 in parallel in wp2 and wp3 respectively. Both tp2 and tp3 can see the data changes made by tp1 (since wp2 and wp3 are child workspaces of wp1), and they can operate independently on the same data elements. After they are done, the workspaces wp2 and wp3 are merged to workspace wp1, and the corresponding save-points (sp-tp2 and sp-tp3) are created in wp1. Finally, the task (tp4) gets executed in wp1, so that task (tp4) can see the changes made by both the parallel branches of tasks tp2 and tp3.

Figure 4:
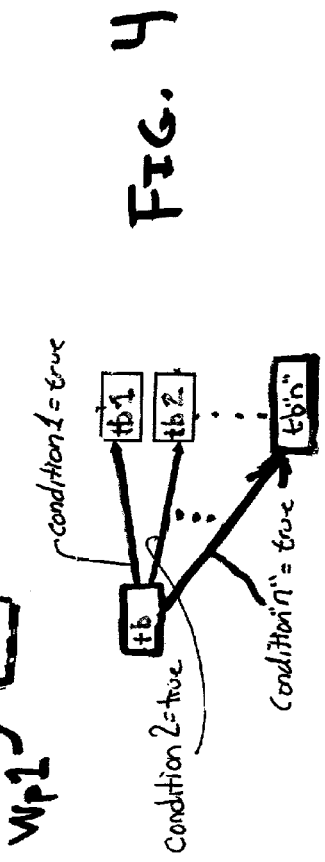

In FIG. 4, the first task (tb) in the tasklist is executed in a workspace (wb, child of w). After first task tb is complete, a save-point sp-tb is created in wb. Then, the next task to be executed can be any one of tb1 to tb-n, depending on whether one of "Condition-1" to "Condition-n" evaluates to true. In the case where "Condition-1" evaluates to true, then tb1 is executed in the workspace wb, which contains the changes made by task tb1. In the case where the "Condition-2" evaluates to true, then the task tb2 is executed in workspace wb. As shown in FIG. 4, the tasklist can include any number of conditions, tb1 to tb-n. During execution, each branch condition can be analyzed and executed, if applicable.

Figure 5:
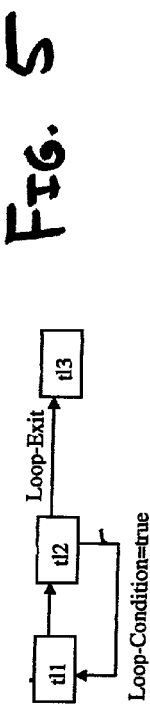

In FIG. 5, the first task (t11) in the tasklist is executed in a workspace (w11, child of w). After t11 is complete, a save-point sp-t11 is created in workspace w11. Then, the next task (t12) is executed in workspace w11. Thereafter, if the "Loop-Condition" expression evaluates to true, t11 is again executed in workspace w11, followed by the execution of t12. This execution process continues until the "Loop-Condition" evaluates to false. Then, a save-point sp-t12 is created in workspace w11. Finally, the task t13 gets executed in workspace w11. It should be noted that although only a single loop is illustrated in FIG. 5, a tasklist could include any desired number of loops or loop-conditions.

When the tasklist (t1) ends, the content of the workspace (w) that was created for the tasklist is merged to the parent workspace where the tasklist was instantiated.

When the tasklist manager 112 of FIG. 1 creates a workspace 120 for executing a certain task, it grants read/write privileges on the workspace 120 and on the data elements of the workspace 120 to the users responsible for executing the task. When one task (t) terminates and another serial task (t') begins in the same workspace, all the workspace privileges and the data item privileges from users of task t are revoked, and all the appropriate workspace/data item privileges are granted to the users of t'. Because the tasklist manager 112 executes tasks in a workspace 120, it can take advantage of all the functionality provided by the workspace infrastructure.

Workspaces 120 support creation of save-points, which can be used to rollback to a previous consistent state in case of exceptions/errors encountered during the execution of a task. Workspaces 120 provide an isolated environment for task execution, so that external work is not affected by the task action consequences until the whole tasklist is completed successfully. In case of system exceptions/errors, the whole tasklist can be aborted, along with the workspace in which it was getting executed, so it can be restarted again later.

The tasklist manager 112 is generally responsible for creating, merging, and aborting the task workspaces 120 automatically based on the task operations. Tasklist manager 112 initializes and associates all of the task and tasklist attributes (if any) to the task and tasklist instances respectively.

Some of the various business operations a user can invoke, and the corresponding actions taken by the tasklist manager 112 are described below.

The user 116 can define a tasklist template/type. The tasklist manager 112 can parse and store the tasklist type specification in the system meta data, which will be later used to create instances of that type via the tasklist manager 112.

A user 116 can also drop a tasklist type. The tasklist manager 112 will drop the system meta data corresponding to that tasklist type. This step fails if there are running instances of the tasklist type.

A user can also begin the tasklist. The tasklist manager 112 will create a workspace 120 for executing the tasklist, and create a sub-workspace for each of the first-tasks in the tasklist. Generally, the tasklist instance is created with status STARTED and all of the task instances defined in the tasklist marked with the status INACTIVE. The tasklist attributes are defined and associated with the tasklist instance. The first task(s) of the tasklist that can be started is activated by changing its status to ACTIVE and execution of this task can begin.

In one embodiment, activating a task does the following:
Changes the task status from INACTIVE to ACTIVE;
Creates a workspace 120, if necessary (depending on this task association as described previously in this section), for executing the task;
If the task is automatic, then its Begin Task is called;
The data element required for the task and not currently present in the task workspace is initialized; and
Workspace privileges and data item privileges are granted to the task users of this task so that they are able to operate on these task workspaces.

When the execution of the task begins ("Begin Task") the task status is changed from ACTIVE to STARTED. The before Begin Task call backs are called (if any). If the task is automatic and not compound, then the specified procedure to do the task is called. Then, the End Task function is called. If the task is a compound task, the first level child task is activated by creating a sub-workspace for each child task where it will get executed. The needed task attributes are defined by the tasklist manager and associated with the task instance.

Calling on activating an End Task function generally includes changing the task status from STARTED to ENDED, and calling after End Task callbacks (if any). If the next task to be executed is a sequential task, a save-point is created in the current task workspace. If the current task being ended is a parallel task, then it is merged to the parent task workspace. Also, a save-point is created in the parent task workspace corresponding to the current task. All the next tasks of the current task are determined, and it is checked if they can be activated. If so, these tasks are activated. If no next task is found, the current task is checked to see if it is part of a compound task. If so, the parent compound task is ended and the current task workspace is merged to the parent compound task workspace. Otherwise, the tasklist is ended, by changing its status to ENDED and the current task workspace is merged to the tasklist workspace (if needed).

The tasklist Ended function can include merging the tasklist workspace to the user workspace, which had instantiated the tasklist, and changing status of the tasklist to ENDED.

The user 116 can also save a task ("Save Task"). This includes creating a save-point for the task workspace, which the task user can rollback to in case of a further error.

The user 116 can also select to roll back a task to a certain save-point. In this case, the data/resources of the task workspace are rolled back to a save-point that was previously created.

The user can also choose to add/delete/modify content and resource within a task. This can include the ability to add/delete/modify content from the corresponding task workspace.

The user 116 can also select to abort the tasklist ("Abort tasklist"). This can include changing the status of the tasklist to ABORTED, and dropping all the tasklist, task workspaces.

Aborting a task ("Task Abort") includes changing the task status to ABORTED, and dropping the task workspace.

Figure 9:
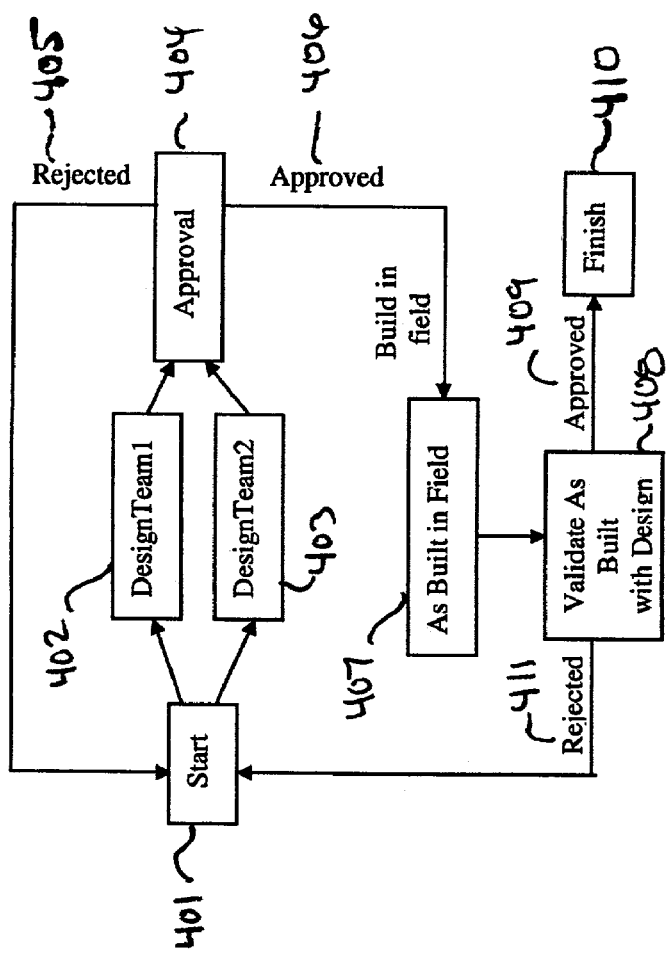
FIG. 9 is a flow chart of one embodiment of an application scenario for a collaborative environment in a geographical information system.

Referring to FIG. 9, an example of an application scenario for a geographical information system needing collaboration is shown. For example, a group of engineers assigned to make changes to a telephone network in a local area as a work order could follow the business process illustrated in FIG. 9. GIS applications providing support for utilities management, land parcel management, AM/FM, etc. typically represent real world objects such as telephone networks, road networks, cable networks, and water lines as relations in a relational database involving spatial geometrys (DWA). Hence, the lifecycle of the work order would involve making modifications to relational data including spatial geometrys in addition to file content.

As shown in FIG. 9, the process for making changes to the telephone network starts in a step 401 with a work order being created for modifying a telephone network. The work order initiates a business process that begins by branching into two independent design teams, in a step 402 and 403. The first team can design the layout for the telephone cables involved in the network and the second team can determine the spatial locations for the telephone poles to be built for the network. Both teams collaborate with their other team members to arrive at their respective final designs. Upon completion of the two design phases, the proposed design goes through an approval process in a step 404. If the proposed design is rejected 405, the process goes back to the start 401 to reevaluate the proposed design. If the proposed design is approved 406, the engineers execute the design in the field. Upon completion of the work in the field, the objects built in the field (as built objects) are made persistent in the database in the As Built In Field phase 407. These as built objects may not conform exactly to the proposed design due to infeasabilities encountered in the field. For example, a telephone pole expected at a certain location could be destroyed due to natural disasters. Hence, the as built objects are validated against the proposed design in a validation stage 408. If the validation is rejected in step 411, the business process goes back to the starting step 401 to redo the entire process. If it is approved 409, the as built objects are committed to the production database and are visible to the outside world, thereby completing the tasklist in a step 410.

The above scenario illustrates some important requirements from a system supporting a business process. A significant amount of data in these applications is stored in a relational database system.

The changes being made to content during the lifecycle of the work order process should not be visible to other users of the content until they are finally published. For example, modifications to the telephone network should not be visible to other applications using the same content (for example, a billing application) until the work order process is complete.

The various phases of the entire lifecycle of the work order such as design, design approval, execution in the filed, validation, and submission can span long durations of time.

Each phase in the tasklist is collaborative in nature and involves a group of people needing to share content, interact, and communicate with each other throughout the process. The tasklist being modeled can be arbitrarily complex.

Tasklist or tasks can be executed within projects. The collaborative framework of the present invention supports a directed acyclic graph (DAG) of workspaces, which can naturally model a project hierarchy. Both relational and file content can be seamlessly manipulated across a workspace hierarchy. Hierarchical projects can be modeled by mapping them to a corresponding structure of hierarchical workspaces 120. The project manager 111 component of the business process manager 114 of FIG. 1, can handle projects and generally supports a hierarchical project structure, which can comprise multiple sub-projects. The projects/sub-projects can be of long duration, and can support multiple users to modify the same content concurrently in a transitionally consistent manner in parent project/sub-projects, and across sibling sub-projects. The project manager 111 supports conflict detection and resolution during merging content from subprojects to parent projects. It also has support for collaboration during long duration projects involving relational database content. For example, allowing multiple users to modify the same content concurrently in a transitionally consistent manner (i.e. satisfying ACID properties [JG]) across long duration projects.

A project template can be used to model a complex/compound business process which is composed of a number of tasklists operating on one or more resources in one or more workspaces. The project templates can include the workspace hierarchy, collaborative components, tasklists, users and even the basic content needed to begin the business process. Such business process modeling includes the details of each of the different component business processes that make up the compound business project. The project template can model a business organization structure in terms of a project hierarchy that can be defined in terms of parent-child relationships. Whenever a child project begins, the data from the parent project is refreshed to the child project. Whenever a child project ends, the data generated/updated within the child project is merged, preferably automatically into the parent project. The projects can be ended manually or automatically based on pre-specified conditions. The present invention builds projects on top of database workspaces that are hierarchical in nature and support refreshing data from a parent workspace to a child workspace, and the merging of data from the child workspace to the parent workspace.

Figure 7:
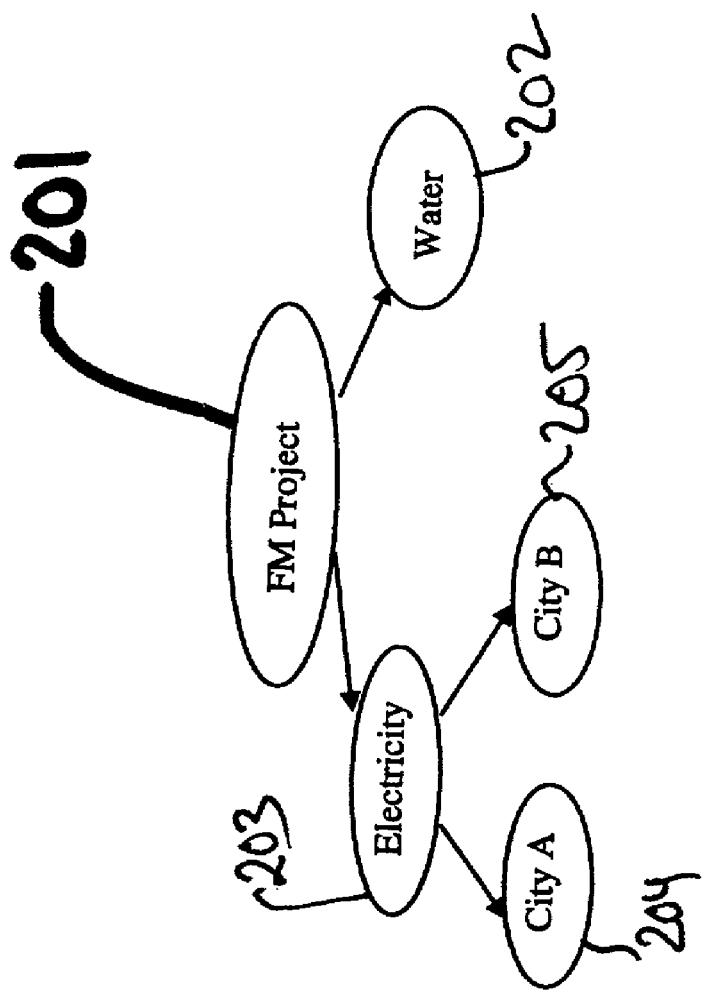
FIG. 7 is an illustration of a hierarchical project structure that can be executed by a system incorporating features of the present invention.

An example of a hierarchical project is illustrated in FIG. 7. The project comprises a Facilities Management (FM) project 201 in a utilities company, and has multiple sub-projects belonging to different divisions of the company (e.g. Electricity, Water etc.). Each of these sub-projects has sub-projects that operate on common content concurrently, giving rise to a hierarchical structure. In FIG. 2, the facilities management project has the sub-projects of water 202 and electricity 203, also called divisions. The electric division 203 has two sub-projects, City A 204 and City B 205.

Each project template/type can contain a list of sub-project types and each sub-project can also include sub-project types. Each project type can be simple or compound. In the situation where the project type is compound, then the project type has sub-project types, which in turn can be simple or compound. Each project type generally includes a project description, project name, and data/resources, which need to be used/operated on inside the project type instances. Also, project type will be associated with a number of project users who can perform the project type instance. Each project type can also have a number of user-defined attributes, which can better describe the project type, and all project types have a "status" attribute, which represents the current state of the project type instance. The "status" value can be a user defined variable and can include for example, STARTED, ENDED, and ABORTED. This attribute can only be modified/initialized by the system when the project users perform certain operations as described in the next section. Also, a project type can contain a number of tasklist types/templates, which can be instantiated within the project instance.

Figure 6:
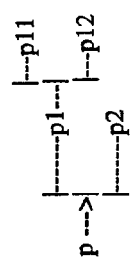
FIG. 6 is an illustration of a project structure and a corresponding workspace structure that can be implemented and executed in a collaborative framework system incorporating features of the present invention.
Figure 6:
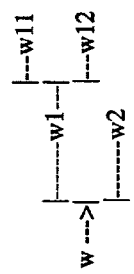

FIG. 6 is an illustration of one embodiment of a compound project p that has two sub-projects, p1 and p2. The sub-project p1 is also a compound project, with sub-project p11 and p12 which are simple and do not have any children projects. Sub-project p2 is a simple project.

When project p begins, the project manager 111 of FIG. 1 creates a workspace (w) for the project (p). If p is a compound project and has sub-projects p1 and p2, the business process manager 114 creates sub-worker spaces of (w), (w1) and (w2). Project p1 and p2 are executed in workspaces w1 and w2 respectively. Thus, the activities of sub-projects p1 and p2 can continue concurrently, in an isolated environment. Also, since p1 is a compound project, the project manager 111 will create workspace w11 and w12 for executing its sub-projects p11 and p12, respectively. When the sub-projects p1 and p12, end the corresponding workspaces w11 and w12 are merged back to w1, and the changes in each sub-project p11 and p12 are visible within the parent project p1 (also a sub-project). When the sub-projects p1 and p2 end, the corresponding workspaces w1 and w2 are merged to w, and the changes in the sub-projects are visible within the parent project.

In the event the sub-projects have modified the same data element or elements, then the sub-projects, which end later, will merge their content after data conflict resolution.

All the data elements in project p are made visible in the workspace (w), so that the project user can operate on the data elements. The data elements can be files/or database content and also collaborative resources.

The project manager 111 is also adapted to grant appropriate privileges on project workspaces and the data/resource content of the project workspaces, so that the project users 116 can have access/modify privileges to the project data so that they can operate on them within the project workspaces 120. When the project is completed or ended, the privileges can automatically terminate if desired.

The present invention allows the execution of the projects within a project workspace 120 and the project user 116 can create save-points during the project execution, after completing a certain portion of the project successfully. During future execution of the project, if there is any exception or error that might result in project data inconsistency, the user 116 can rollback to a previously created save-point and bring this project data to a consistent state.

The project manager 111 also supports the definition of tasklist templates within the project templates. If there are tasklist templates specified with the project templates, this will enable the project users 116 to instantiate instances of those tasklist templates in order to perform the project functions following some pre-specified process model as specified by the tasklist template.

The project manager 111 can take the following system actions during project operations. One action is to define a project type. This generally includes parsing and storing the project type specification in the system meta data, which will be later used to create instances of that type.

A project type can also be dropped. This can include dropping the system meta data corresponding to that project type. This step fails if there are running instances of the project type.

Figure 10:
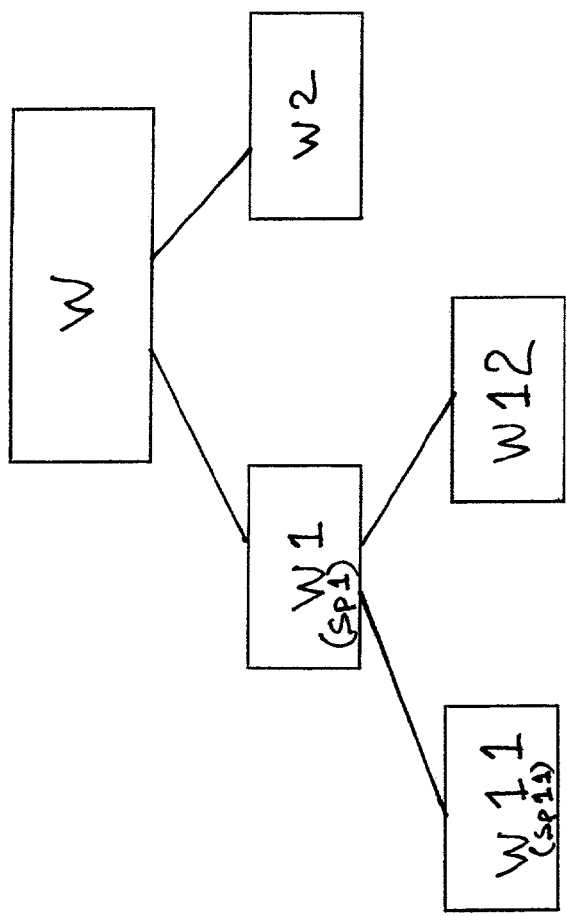
FIG. 10 is a block diagram of another project workspace hierarchy according to aspects of the present invention.

Beginning the project ("Begin Project") causes the project manager 111 to create one project workspace (w) for the project (p). Child workspaces (w1), (w2) of (w) can be created for each sub-project (sp) of the project (p). For example, if sp1 is a sub-project of p, then the project manager 111 will create a workspace w1 that is a child workspace of w for doing sp1. If sp1 is a compound project and has more sub-projects, then the project manager 111 and workspace manager 110 will repeat the same process of creating child workspaces for all of the sub-projects. If sp11 is a sub-project of sp1, then a child workspace (w11) of w1 will be created for sub-project sp11. Thus, as shown, in order to execute a hierarchical compound project such as that shown in FIG. 7, the system 10 of FIG. 1 will create a hierarchy of corresponding workspaces such as the hierarchy shown in FIG. 10. Each project and sub-project is executed within the corresponding workspaces.

After the workspaces are created, the resource items are defined. This includes defining/including the data/collaborative resource items for every project/sub-project as specified by the project template specification.

The project manager 111 will also assign read/write privileges on each project and sub-project workspace and data/resource items within project workspaces, to the users 116 of each project/sub-projects. The "status" of all project/sub-projects can then be changed to STARTED, or some similar functional indication.

Ending the project ("End Project") generally includes merging the content of the current project workspace to its parent project workspace. If a project or sub-project has operated on a data element that was also modified by a sibling project or sub-project, then the content of the data element(s) needs to be checked during conflict resolution. Generally, after the project ends, the workspace is frozen so that no more work can be done in that project and the "status" of the project can now be changed to ENDED.

A project can also be aborted ("Abort Project"). This includes aborting the changes made in the project workspace, and restoring the state of the workspace to the point it was at before the project was started. The status of the project is changed to ABORTED.

A project can be saved. Saving the project generally includes creating a save-point for the project workspace that the project user can rollback to in case of a further error. The saving step can occur once the project execution is complete.

Rolling the project back to a certain save-point generally includes rolling back the data/resources of the project workspace to a state of a save-point that was previously created.

The user can also add/delete/modify content and resource within a project as well as add/delete/modify content from the corresponding project workspace.

Figure 8:
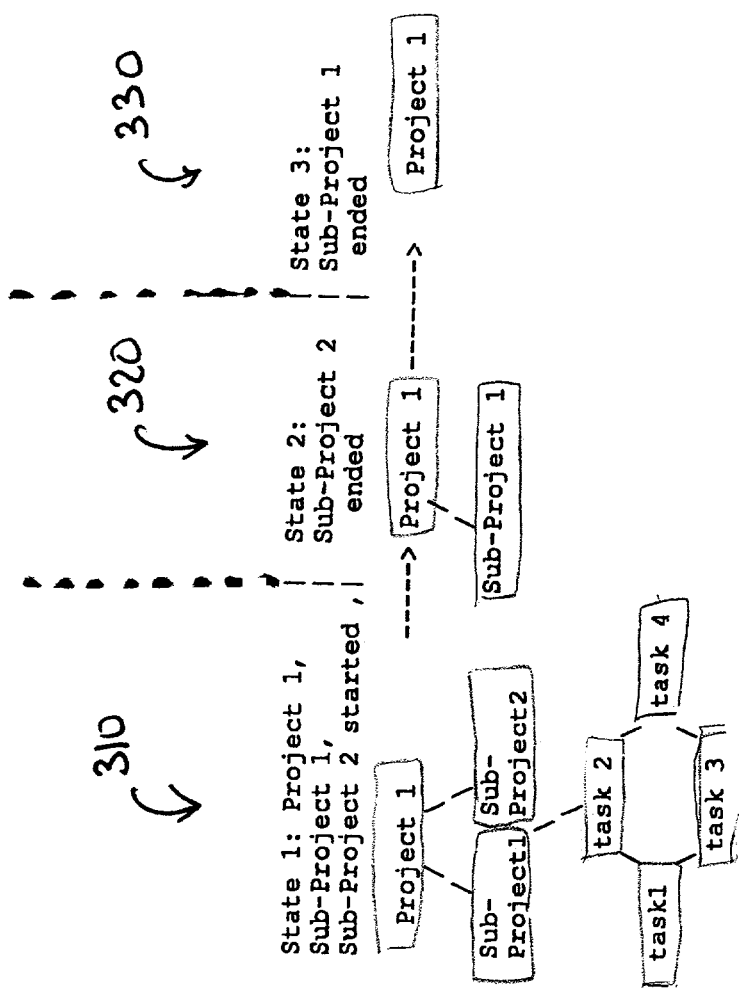
FIG. 8 is an illustration of different states of a project in a collaborative framework system incorporating features of the present invention.

FIG. 8 shows the different states of a project template instance in execution. State 1 shows that a Project 1 contains two sub-projects, Sub-Project 1 and Sub-Project 2. The workflow with Sub-Project 1 is modeled by traditional workflow. Sub-Project 1 includes a tasklist/workflow, which requires task 1 to be performed, followed by task 2 and task 3 in parallel, and thereafter task 4. State 2 represents that Sub-Project 2 has ended and its data has been merged into Project 1, while Sub-Project 1 is still continuing. State 3 represents that Sub-Project 1 has also ended, and its data is merged into Project 1.

One example of a project template includes an IT Rollout of status reports of multiple groups within an organization. This is an example of an independent business process/project that is not associated with any resource. In this case, there is no input to the project. Rather, the project generates an output of the status and comments.

Business Process (No input)→Generates Output+Status+ comments

The Project Template Attributes could include for example:

Name
Before (Alert, Email, Callback)
After (Alert, Email, Callback)
TaskList (Simple/compound actions)
Status (INACTIVE, ACTIVE, ENDED)
User/Roles
Resources
Comments (Results of a Business Process)
Component business processes (these are present only in case of a compound business process)

The Project operations for the IT Rollout of status reports could include:

Begin Project
Abort Project
End Project
Manage Project (for example create a savepoint within a project or rollback a savepoint within a project)

The present invention provides reference/access to the business process from the Workspace Environment. Whenever a user plays a role in a business process, there will be pointers to the business process workspaces the user is involved in, from the workspace environment. The user will go into the appropriate business process workspaces, perform necessary actions and change the status. When the business process is over, then the references to it from the collaborative environment will be automatically deleted.

Another application of the present invention is within the context of a database management system ("DBMS"). Databases are generally used to store large amounts of information in a structured manner for subsequent retrieval and processing. Databases, in turn, are managed by data base management systems. A DBMS allows one to submit a query identifying a number of criteria for the information that is to be retrieved from the database. Queries may be submitted by a computer user, in which case the DBMS can return the subset of information stored in the database that conforms to that identified by the query for, for example, display to the user. Alternatively, queries may be submitted by an application program, in which case the DBMS can return the information to the application program for processing. The DBMS can also receive information from a user or application program for storage in the database, and the DBMS can, after receiving the information, use the information to update the database.

In one type of DBMS, generally referred to as a relational database system, information is stored in tables, with each table comprising a two-dimensional array organized as a plurality of rows and columns. Information stored in a relational database system is in the form of records, with each record comprising one or more fields each associated with an attribute. In a table in a relational database system, the attributes associated with the records are stored in the same order, so that for all records the "j-th" filed will be associated with the same attribute. Generally, information from one or a combination of predetermined ones of the attributes of each record will be selected to comprise a record "key," whose value is used to uniquely identify the respective record.

In many kinds of application, it is desirable to allow a user to make use of one or more tables, or portions thereof, of a database, as they exist at a particular point in time and update the information therein, with the updates not being visible to other users while the information is being updated. Examples of a version control system for use with a database management system are described in U.S. Pat. Nos. 6,631,386 issued on Oct. 7, 2003; 6,598,059 issued on Jul. 22, 2003; 6,557,012 issued on Apr. 29, 2003; and 6,584,476 issued on Jun. 24, 2003 each filed on Apr. 22, 2000, the disclosures of which are incorporated herein by reference in their entireties.

Figure 11:
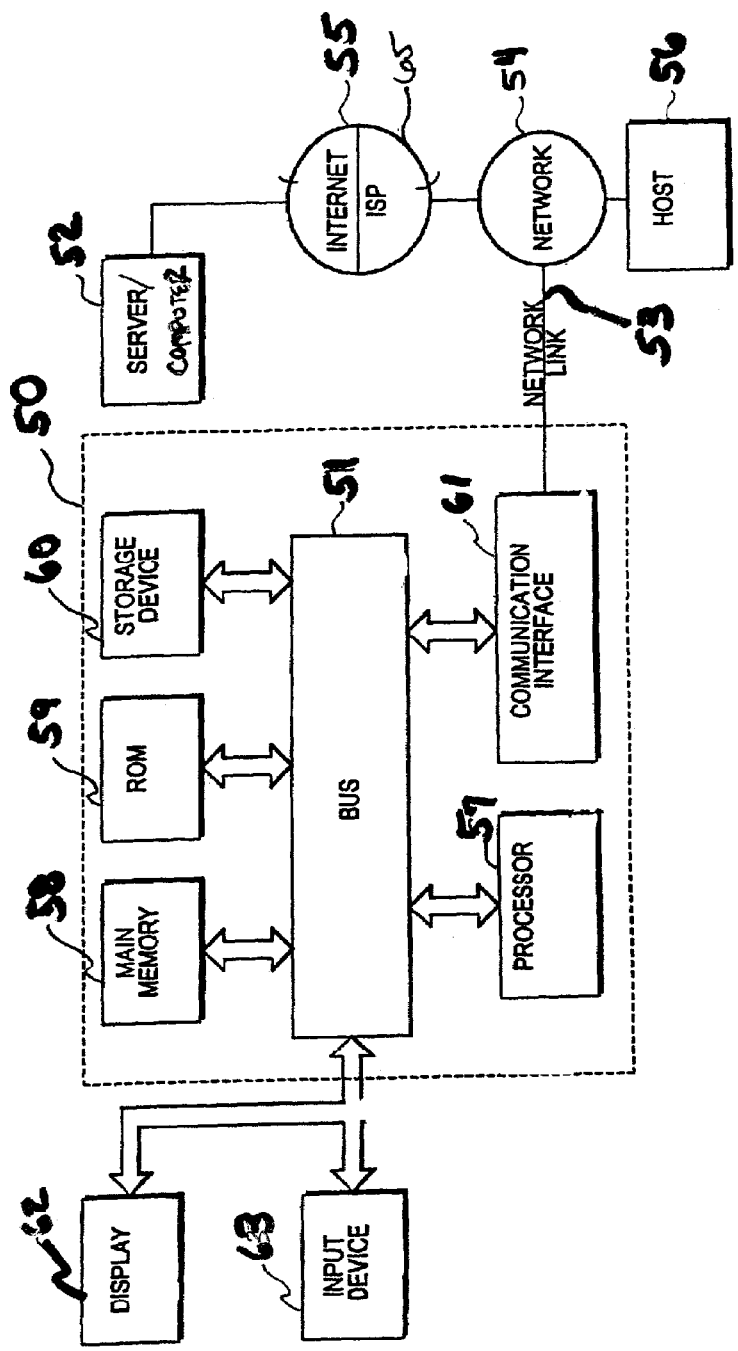
FIG. 11 is an example of one embodiment of an apparatus that can be used to practice the present invention.

The present invention may also include software and computer programs incorporating the process steps and instructions described above that are executed in different computers. In the preferred embodiment, the computers are connected to the Internet. FIG. 11 is a block diagram of one embodiment of a typical apparatus incorporating features of the present invention that may be used to practice or implement the present invention. As shown, a computer system 50 may be linked to another computer system 52, such that the computers 50 and 52 are capable of sending information to each other and receiving information from each other. In one embodiment, computer system 52 could comprise or include a server computer adapted to communicate with a network 54, such as for example, the Internet 55. Computer systems 50 and 52 can be linked together over a link 53 in any conventional manner including a modem, hard wire connection, or fiber optic link. The computer system 50 can include a bus 51 or other communication mechanism for communicating information, and a processor 57 such as for example, a microprocessor coupled with bus 51 for processing information and executing stored programs. The computer system 50 can also include a main memory 58, such as a random access memory (RAM) or other dynamic storage device, coupled to the bus 51 for storing information and instructions to be executed by the processor 57. The main memory 58 also may be used for storing temporary variables or other intermediate information during execution of instructions to be executed by the processor 57. The computer system 50 can also include a read only memory (ROM) 59 or other static storage device coupled to the bus 51 for storing static information and instructions for the processor 57. Computer systems 50 and 52 may also include a microprocessor for executing stored programs. Computer 50 may include a data storage device 60 on its program storage device for the storage of information and data. The computer program or software incorporating the processes and method steps of the present invention may be stored in one or more computers 50 and 52 on an otherwise conventional program storage device. It should be noted that although the above discussion pertains to computer system 50, computer 52 could include similar utilities and program storage devices.

Computers 50 and 52 are generally adapted to utilize program storage devices 60 embodying machine readable program source code that is adapted to cause the computers 50 and 52 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

In one embodiment, computers 50 and 52 may include a display interface 62 and a user interface 63, from which features of the present invention can be accessed and displayed. The display interface 62 is generally adapted to display information to a user and can comprise any suitable display means. The user interface 63 is generally an input device coupled to the bus 51 that communicates information and command selections to the processor 57. The information and command selections can be inputted manually by a user, or in alternate embodiments, automatically. Examples of input devices can include a keyboard, a mouse or trackball, or a voice activated input device. The user interface 63 and the display interface 62 can be adapted to allow the input of queries and commands to the system, as well as present the results of the commands and queries.

In one embodiment, the invention is related to the use of the computer system 50 to provide a collaborative framework environment and to model and execute business processes within the environment. According to one embodiment of the invention, the method steps of the present invention are performed by the computer system 50 in response to the processor 57 executing one or more sequences of one or more instructions contained in the main memory 58. Such instructions may be read into the main memory 58 from another computer-readable medium, such as the storage device 60. Execution of the sequences of instructions contained in the main memory 58 causes the processor 57 to perform the process steps described herein for executing business processes in a collaborative framework. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein generally refers to any medium that participates in providing instructions to the processor 57 for execution. Such a medium may take many forms, including but not limited to, non-volatile media, volatile media, and transmission media. Non-volatile media can include, for example, optical or magnetic disks, such as the storage device 60. Volatile media may include dynamic memory, such as the main memory 58. Transmission media includes coaxial cables, copper wire and fiber optics, including the wires that comprise the bus 51. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, or any other medium from which a computer can read.

Various forms of computer readable media may be involved in carrying out one or more sequences of one or more instructions to the processor 57 for execution. For example, the instructions may initially be carried on a magnetic disk of a remote computer. The remote computer can load the instructions into its dynamic memory and send the instructions over a telephone line using a modem. A modem local to computer system 50 can receive the data on the telephone line and use for example, an infra-red transmitter to convert the data to an infra-red signal. An infra-red detector coupled to appropriate circuitry can receive the data carried in the infra-red signal and place the data on the bus 51. The bus 51 carries the data to the main memory 58, from which the processor 57 retrieves and executes the instructions. The instructions received by the main memory 58 may optionally be stored on the storage device 60 either before or after execution by the processor 57.

The computer system 50 also includes a communication interface 61 coupled to the bus 51 to make information available to the computer systems 50, 52. The communication interface 61 provides a two-way data communication coupling to a network link 53 that is connected to a network 54. For example, the communication interface 61 may be an integrated services digital network (ISDN) card or a modem to provide a data communication connection to a corresponding type of telephone line. As another example, the communication interface 61 may be a local area network (LAN) card to provide a data communication connection to a compatible LAN. Wireless links may also be implemented. In any such implementation, the communication interface 61 sends and receives electrical, electromagnetic or optical signals that carry digital data streams representing various types of information. The network link 53 typically provides data communication through one or more networks to other data devices. For example, the network link 53 may provide a connection through the network 54 to a host computer 56 or to data equipment operated by an Internet Service Provider (ISP) 65. The ISP 65 in turn provides data communication services through the world wide packet data communication network now commonly referred to as the "Internet" 55. The network 54 and the Internet 55 both use electrical, electromagnetic or optical signals that carry digital data streams. The communication interface 61 can carry the digital data to and from the computer system 50. The signals carried through the various networks, and the signals carried on the network link 53 and through the communication interface 61, are exemplary forms of carrier waves transporting the information.

The computer system 50 can also be adapted to send messages and receive data, including program code, through the network(s), the network link 53 and communication interface 61. If the communication network is the Internet, for example, a server 52 might transmit a request code for an application program through the Internet 55, the ISP 65, the network 54 and the communication interface 61. The received program code may be executed by the processor 57 as it is received, and/or stored in the storage device 60, or other non-volatile storage for later execution. In this manner, the computer system 50 may obtain application program code in the form of a carrier wave.

In the embodiments of the present invention, the business process instance gets executed in a workspace 120, which provides an isolated execution environment. This allows the different tasks in the business process to operate on data items without affecting the external view of the data until the whole business process is completed. The exceptions raised in any tasklist, project of the business process can be handled efficiently by rolling back to an appropriate save-point of the users' choice. The privileges needed by the user to operate on the data items in a tasklist, project can be easily enforced by the workspace privilege management mechanism. So users can be granted access/modify privileges on data items at task level, since each task is executed within a workspace.

During a parallel task execution, the tasklist manager 112 creates a child workspace for each task, thus enabling each parallel task to operate on the same data item concurrently. Also, conflicts can be resolved (if any) at the end task time, when the child task workspaces are merged to the parent workspace.

The present invention provides a business process template (tasklist template/project template) specification mechanism to specify hierarchical projects and arbitrary tasklists. The template specification supports and encourages reuse of best practices.

The present invention also provides a long transaction based project execution mechanism, by mapping hierarchical project structures to long transaction workspace hierarchies. This allows concurrent updates of same resources in sub-projects, and supports the merging of resources from multiple sub-projects. Also, the long transaction workspace based execution mechanism supports creation of save-points (by user and system) and enable rolling back to a previously created save-point. This enables graceful error handling and recovery during project execution.

The present invention also provides a long transaction based tasklist execution mechanism which provides an isolated task execution environment, and allows concurrent updates of same resources in parallel tasks, and supports the merging of resources from multiple parallel tasks with synchronization time with conflict resolution. Also, the long transaction workspace based execution mechanism supports creation of save-points (by user and system) and enables rolling back to a previously created save-point during task/tasklist execution. This enables graceful error handling and recovery during tasklist/task execution.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of executing a project within a collaborative environment in a relational database system comprising:
   creating at least one task type, each task type modeling a task in a business process;
   creating at least one tasklist template, each tasklist template comprising an ordered set of task types connected to each other via task associations;
   detecting an occurrence of a tasklist trigger event of a child project;
   associating a task list template with each child project of the project template corresponding to a resource associated with the tasklist trigger event;
   automatically invoking execution of the tasklist template;
   creating a parent workspace in the system for executing the parent project and at least one child workspace in the system for each child project of the parent project as defined by the task list template, wherein each child workspace is isolated from the parent workspace and configured to operate on data content of the parent workspace concurrently with any other child workspace and independently of any other child workspace;
   executing each task type of each child project defined by the task list template in a respective child project task workspace each task type being executed in an isolated environment independent of any other task type;
   merging data content of each child project task workspace back to the child project workspace at any point during execution of a respective task;
   making the data content of each task workspace merged back to the child project workspace from which the task was created visible to all other child workspaces of the child project workspace at the time the data content is merged; and
   merging a content of each child workspace back to the parent workspace in the system.

2. The method of claim 1 further comprising after executing each child project task:
   executing, if any, each subsequent child project of each preceding child project in a respective subsequent child workspace, wherein activities of each subsequent child project continue concurrently in an isolated environment;
   executing remaining subsequent child projects in a similar fashion along a hierarchical chain of preceding projects and subsequent projects until all subprojects of the parent project are executed; and
   merging each subsequent child workspace in the hierarchical chain back to a respective preceding workspace, wherein changes in each subsequent child workspace are visible in the preceding project workspace, the step of merging continuing until each child workspace is merged into the parent workspace.

3. The method of claim 1 further comprising, after execution of each child project of the parent project, creating a save-point in each respective child workspace corresponding to an executed version of each child project, wherein a user can roll back to any save-point during execution of the project in order to bring project data to a consistent state.

4. The method of claim 1 further comprising creating a save-point during each project execution allowing a user to roll back to a previously created save-point to bring project data to a consistent state.

5. The method of claim 4 further comprising rolling back data and resources of the child workspace to a state of a save-point that was previously created.

6. The method of claim 1 wherein creating a parent workspace or child workspace further comprises granting read/write privileges on each created workspace and on data elements of each workspace to at least one user responsible for executing the project.

7. The method of claim 1 wherein executing each subsequent child project further comprises granting new workspace and data item privileges to users of the subsequent child project.

8. The method of claim 1 wherein creating a child workspace further comprises:
   defining a project type in order to create a instance of the project type; and
   beginning the project instance, including changing a status of the project to STARTED.

9. The method of claim 1 wherein creating a child project task workspace for each child project of the parent project further comprises;
  determining if any of each child project is a compound project, wherein each compound project includes sub-projects; and
  creating another workspace for each sub-project of each compound project, wherein a hierarchy of workspaces is created to execute a hierarchical compound project.

10. The method of claim 1 further comprising:
  determining, after merging, if the data content operated on in one child project task was also modified in a sibling child project task, wherein a conflict resolution is performed on a content of the child workspace;
  freezing the child workspace so no more work can be done in that project; and
  changing a status of the project to reflect that the project is ENDED.

11. The method of claim 1 wherein the project includes one or more tasklists, and wherein each tasklist can be adapted to be executed within the project.

12. A system comprising:
  at least one processor for modeling and executing tasklists within a collaborative environment in a database system
  a workspace manager in the at least one processor configured to support workspaces in the database system for performing tasks and create a child workspace for each child project;
  a tasklist template manager in the at least one processor configured to model at least one tasklist, wherein each tasklist comprises one or more tasks to be performed in workspaces, each workspace configured to be isolated and independent from any other workspace; and
  a tasklist manager in the at least one processor configured to detect an occurrence of a tasklist trigger event of a child project, associate a stored tasklist template with the child project, and automatically invoke execution of the stored tasklist template using a set of workspaces in the database system, wherein the tasklist manager is configured to create a task workspace in the workspace manager for each task in the tasklist as modeled by the tasklist template and wherein the tasklist manager provides an isolated environment for task execution by executing each task within a respective task workspace and publishing data content of each task to the child workspace from the respective task workspace at any point during execution of the task, where any other task created within the child workspace can view data content published to the child workspace.

13. The system of claim 12 wherein when the tasklist manager creates a task workspace, the tasklist manager is adapted to grant read/write privileges on the workspace and on data elements of the workspace to users responsible for executing the task.

14. The system of claim 12 wherein the workspace manager is adapted to support a creation of save-points that can be used to roll back to a previous consistent state in case of exceptions or errors encountered during execution of a task.

15. The system of claim 12 wherein a workspace provides an isolated environment for task execution so that task execution action does not affect an external environment until all tasks in the tasklist are completed successfully.

16. The system of claim 12 wherein the tasklist manager is adapted to create, merge and abort task workspaces automatically based on task operations.

17. The system of claim 12 wherein the tasklist manager is adapted to initialize and associate all task and tasklist attributes to task and tasklist instances, respectively.

18. The system of claim 12 wherein the collaborative environment comprises an Internet collaboration environment, wherein the modeling and execution of business process occurs by multiple people at different geographic locations communicating by collaborating with a web browser.

19. A computer program product stored in a memory comprising:
  a computer useable medium having computer readable code means embodied therein for causing a computer to execute a project within a collaborative environment in a database system, the computer readable code means in the computer program product comprising:
  computer readable program code means for causing a computer to create a parent workspace in the database system for a parent project and at least one child workspace in the database system for each child project of the parent project, wherein each child workspace is isolated from the parent workspace and configured to operate on data content of the parent workspace concurrently with any other child workspace and independently of any other child workspace;
  computer readable program code means for causing a computer to create at least one task type, each task type modelling a task in a business process, and at least one tasklist template comprising an ordered set of tasks connected to each other via task associations;
  computer readable program code means for causing a computer to detect an occurrence of a tasklist trigger event of a child project and associate a task list template with the child project;
  computer readable program code means for causing a computer to automatically invoke execution of the associated tasklist template for each task of each child project in a respective child project task workspace, each task being executed in an isolated environment independent of any other task;
  computer readable program code means for causing a computer to merge data content from each child project task workspace back to the child project workspace at any point in time during execution of a respective task;
  computer readable program code means for causing a computer to make the data content of each task merged to the child workspace visible to all other child workspaces at the time the data content is merged; and
  computer readable program code means for causing a computer to merge a content of each child workspace back to the parent workspace.

20. An article of manufacture comprising:
  a computer useable medium having computer readable code means embodied therein for causing a computer to execute a project within a collaborative environment in a database system, the computer readable code means in the computer program product comprising:
  computer readable program code means for causing a computer to create a parent workspace in the database system for a parent project and at least one child workspace in the database system for each child project of the parent project, wherein each child workspace is isolated from the parent workspace and configured to operate on data content of the parent workspace concurrently with any other child workspace and independently of any other child workspace;

computer readable program code means for causing a computer to create at least one task type, each task type modelling a task in a business process, and at least one tasklist template comprising an ordered set of tasks connected to each other via task associations;

computer readable program code means for causing a computer to detect an occurrence of a tasklist trigger event of a child project and associate a task list template with the child project;

computer readable program code means for causing a computer to automatically invoke execution of the associated tasklist template for each task of each child project in a respective child project task workspace, each task being executed in an isolated environment independent of any other task;

computer readable program code means for causing a computer to merge data content from each child project task workspace back to the child project workspace at any point in time during execution of a respective task;

computer readable program code means for causing a computer to make the data content of each task merged to the child workspace visible to all other child workspaces at the time the data content is merged; and computer readable program code means for causing a computer to merge a content of each child workspace back to the parent workspace.

21. The method of claim 1 further comprising, when the child project begins, refreshing data related to the task from the parent project to the child project, the refreshed data including changes received by the parent workspace from each child workspace that has merged to the parent workspace.

22. The method of claim 1 further comprising merging each child workspace back to the parent workspace at any point in time during execution of the child project in the child workspace.

23. The method of claim 1 further comprising merging one child workspace back to the parent workspace independently of any other child workspace.

24. The method of claim 1 further comprising merging at least one child workspace back to the parent workspace and refreshing the at least one child workspace with data from the parent workspace when execution on the at least one child workspace resumes, the data from the parent workspace including changes received from other executing child workspaces that have merged back to the parent workspace.

25. The method of claim 1 further comprising:
intermittently merging data content from the at least one child workspace back to the parent workspace during execution of the project in the at least one child workspace prior to completion of the respective child project; and
refreshing data from the parent workspace to the at least one child workspace prior to resuming execution of the at least one child workspace, the refreshed data including at least partially completed results received from at least one other child workspace that has merged its data content back to the parent workspace.

26. The method of claim 1 further comprising executing each task by;
determining a type of a current task to be executed;
if the current task is not a compound task, executing a specified procedure for the current task in a current task workspace; and
if the current task is a compound task, activate a first level child task by creating a sub-workspace for each first level child task where each first level child task will be executed, each sub-workspace configured to operate on common data elements of the data content in an independent and isolated environment.

27. The method of claim 26 further comprising:
determining if a next task to be executed is a sequential task, and if so, creating a savepoint for the current task being ended in the current task workspace; and
determining if the current task being ended is a parallel task, and if so, merging the ended current task in the sub-workspace back to the child project task workspace.

28. The method of claim 1 wherein the parent workspace is geographically dispersed from the child workspace, each child workspace is geographically dispersed from any other child workspace.

29. The method of claim 1 wherein the parent and child workspaces are accessible in an online environment.

30. The method of claim 1 wherein changes made to data content in each child-project task workspace are not visible to other users of the data content until the data content from a respective child project task workspace is published from the respective child project task workspace to the child workspace.

31. The method of claim 1 further comprising that each child workspace is configured to operate on data content from the parent workspace, wherein the data content being operated on in each child workspace is the same data content.

32. The method of claim 1 wherein the data content is relational database content.

33. The method of claim 1 further comprising refreshing content on demand or periodically from the parent project workspace to the child project workspace at anytime during a lifetime of the child project.

34. The method of claim 1 further comprising refreshing content on demand or periodically from the parent project workspace to the child task workspace at anytime during a lifetime of the child task.

35. The method of claim 1 further comprising:
defining at least one project/task template;
defining a triggering event to automatically invoke application of the at least one project/task template; and
automatically executing the at least one project/task template in a respective workspace when the triggering event occurs.

36. The method of claim 35 further comprising automatically creating a project/task workspace corresponding to the at least one project/task template in response to the triggering event.

37. The system of claim 12 wherein the tasklist template further comprises a document type definition that is automatically invoked in response to a triggering event to automatically instantiate an instance of the tasklist.

38. The method of claim 1 wherein the task type comprises a task name, a task description and task data and resources which need to be operated on inside the task.

* * * * *

UNITED STATES PATENT AND TRADEMARK OFFICE
CERTIFICATE OF CORRECTION

PATENT NO.        : 7,386,797 B1
APPLICATION NO.   : 10/154152
DATED             : June 10, 2008
INVENTOR(S)       : Chatterjee et al.

It is certified that error appears in the above-identified patent and that said Letters Patent is hereby corrected as shown below:

On the Title Page Item (56), under "U.S. Patent Documents", line 10, delete "715/500" and insert -- 715/205 --, therefor.

In column 9, line 58, delete "infeasabilities" and insert -- infeasibilities --, therefor.

In column 10, line 34, delete "subprojects" and insert -- sub-projects --, therefor.

In column 18, line 32, in claim 2, delete "subprojects" and insert -- sub-projects --, therefor.

In column 19, line 3, in claim 9, delete "comprises;" and insert -- comprises: --, therefor.

In column 21, line 60, in claim 26, delete "by;" and insert -- by: --, therefor.

In column 22, line 23, in claim 30, delete "child-project" and insert -- child project --, therefor.

Signed and Sealed this

Seventh Day of July, 2009

JOHN DOLL
*Acting Director of the United States Patent and Trademark Office*